(12) United States Patent
Chen et al.

(10) Patent No.: US 10,209,756 B2
(45) Date of Patent: Feb. 19, 2019

(54) OPERATING SYSTEM AND CONTROL METHOD THEREOF

(71) Applicant: VIA TECHNOLOGIES, INC., New Taipei (TW)

(72) Inventors: Wei-Hung Chen, New Taipei (TW); Kuo-Yu Wu, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 121 days.

(21) Appl. No.: 15/286,858

(22) Filed: Oct. 6, 2016

(65) Prior Publication Data

US 2017/0277240 A1    Sep. 28, 2017

(30) Foreign Application Priority Data

Mar. 25, 2016   (TW) ............................. 105109378 A

(51) Int. Cl.
*G06F 1/28* (2006.01)
*H02M 1/32* (2007.01)

(52) U.S. Cl.
CPC ............... *G06F 1/28* (2013.01); *H02M 1/32* (2013.01)

(58) Field of Classification Search
CPC .................................. G06F 1/28; H02M 1/32
USPC ......... 713/340; 702/182; 323/311, 274, 271; 363/21.02
See application file for complete search history.

(56) References Cited

U.S. PATENT DOCUMENTS

| 6,611,132 B2 | 8/2003 | Nakagawa et al. | |
| 7,772,904 B1 | 8/2010 | Cooke | |
| 7,782,002 B2 | 8/2010 | Cook, II | |
| 9,461,539 B2 | 10/2016 | Chern et al. | |
| 2002/0130645 A1* | 9/2002 | Tsai | G05F 1/24 323/274 |
| 2004/0196669 A1* | 10/2004 | Thrap | H02M 1/4258 363/19 |
| 2010/0125435 A1* | 5/2010 | Pong | G06F 1/28 702/182 |
| 2011/0002070 A1* | 1/2011 | De Anna | H02M 1/32 361/37 |

(Continued)

FOREIGN PATENT DOCUMENTS

| CN | 1374739 A | 10/2002 |
| CN | 101009468 | 8/2007 |

(Continued)

OTHER PUBLICATIONS

Chinese language office action dated Jan. 3, 2017, issued in application No. TW 105109378.

(Continued)

*Primary Examiner* — Aurel Prifti
(74) *Attorney, Agent, or Firm* — McClure, Qualey & Rodack, LLP

(57) ABSTRACT

An operating system including a voltage converter, a processing circuit, and a protector is provided. The voltage converter converts an input voltage according to a feedback voltage to generate an output voltage. The processing circuit is coupled to the voltage converter and processes the output voltage according to a control signal to generate the feedback voltage. The protector is coupled to the voltage converter and the processing circuit and activates or deactivates the voltage converter according to the feedback voltage.

14 Claims, 4 Drawing Sheets

(56) References Cited

U.S. PATENT DOCUMENTS

| | | | | |
|---|---|---|---|---|
| 2011/0225441 | A1* | 9/2011 | Chueh | G06F 1/28 713/340 |
| 2011/0292688 | A1* | 12/2011 | Zhang | H02M 1/32 363/21.02 |
| 2014/0071720 | A1* | 3/2014 | Ouyang | H02H 7/1213 363/50 |
| 2014/0285174 | A1* | 9/2014 | Jessenig | H02M 3/156 323/311 |
| 2015/0029618 | A1* | 1/2015 | Collins | H02H 7/1252 361/18 |
| 2015/0207401 | A1* | 7/2015 | Zhang | H02M 3/158 323/271 |

FOREIGN PATENT DOCUMENTS

| | | |
|---|---|---|
| CN | 201383774 Y | 1/2010 |
| CN | 102573192 | 7/2012 |
| CN | 203607824 | 5/2014 |
| CN | 104049662 A | 9/2014 |

OTHER PUBLICATIONS

Chinese language office action dated Dec. 4, 2017, issued in application No. CN 201610264194.5.

\* cited by examiner

OPERATING SYSTEM AND CONTROL METHOD THEREOF

CROSS REFERENCE TO RELATED APPLICATIONS

This Application claims priority of Taiwan Patent Application No. 105109378, filed on Mar. 25, 2016, the entirety of which is incorporated by reference herein.

BACKGROUND OF THE INVENTION

Field of the Invention

The invention relates to an operating system, and more particularly to an operating system that is capable of generating different output voltages.

Description of the Related Art

Many electronic elements are disposed inside of each electronic device. The operation voltages of the electronic elements are not the same. Generally, different electronic elements need different operating voltages. However, a conventional power converter only provides a single output voltage. Therefore, many power converters are disposed inside of the electronic device to provide different operating voltages to different electronic elements, increasing the cost of the electronic device and taking up usable space in the electronic device.

BRIEF SUMMARY OF THE INVENTION

In accordance with an embodiment, an operating system includes a voltage converter, a processing circuit, and a protector. The voltage converter converts an input voltage according to a feedback voltage to generate an output voltage. The processing circuit is coupled to the voltage converter and processes the output voltage according to a control signal to generate the feedback voltage. The protector is coupled to the voltage converter and the processing circuit and activates or deactivates the voltage converter according to the feedback voltage.

In accordance with a further embodiment, a control method is described below. An input voltage is converted to an output voltage according to a feedback voltage. The output voltage is processed to generate the feedback voltage according to a control signal. The feedback voltage is detected. When the feedback voltage is higher than a reference voltage, the input voltage is not converted. When the feedback voltage is not higher than the reference voltage, the input voltage is converted.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
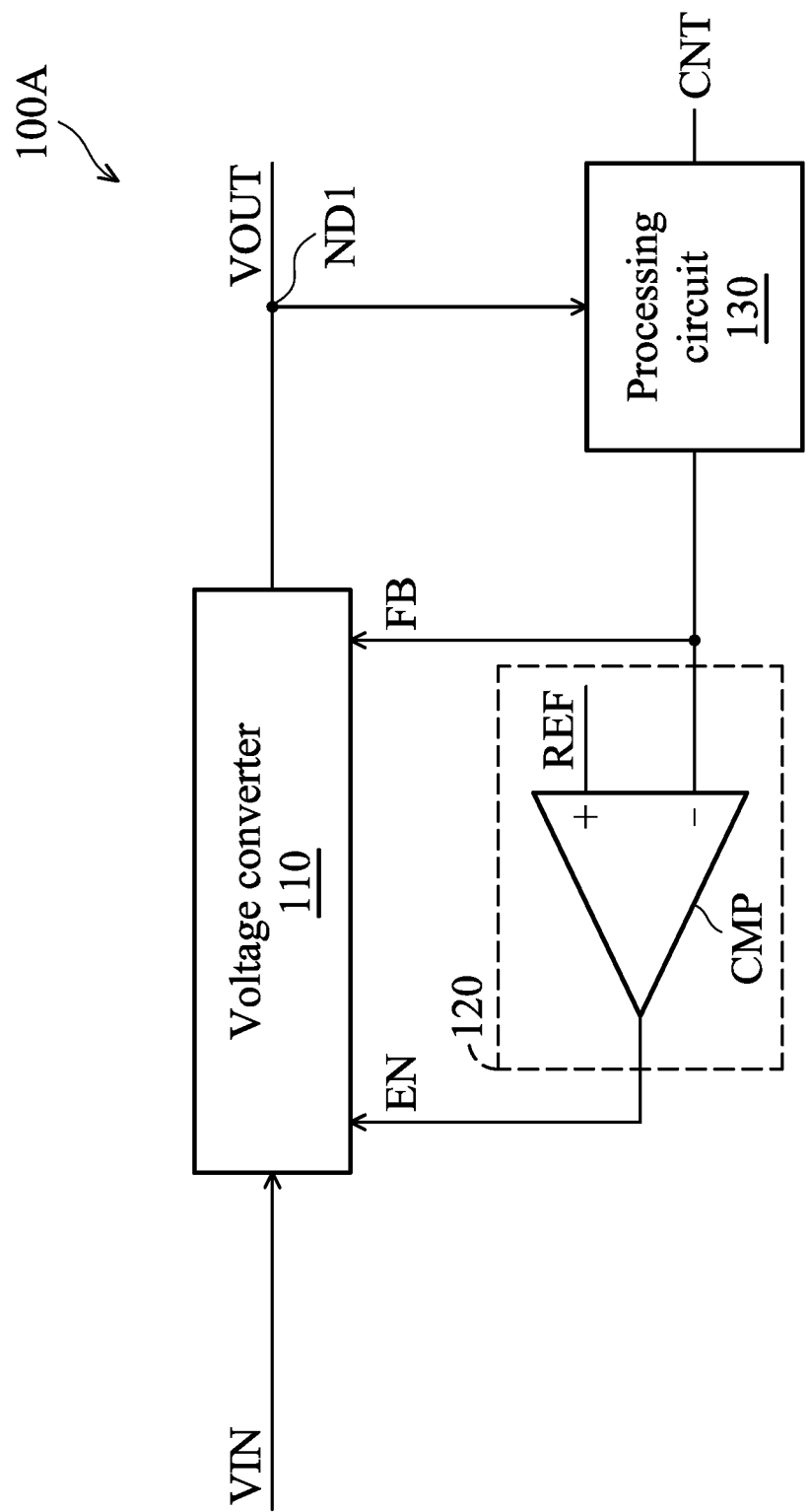
FIGS. 1A and 1B are schematic diagrams of exemplary embodiments of an operating system, according to various aspects of the present disclosure.

FIG. 1A is a schematic diagram of an exemplary embodiment of an operating system, according to various aspects of the present disclosure. The operating system 100A includes a voltage converter 110, a protector 120, and a processing circuit 130. In one embodiment, the operating system 100A is a power management IC to provide power to an external device. The operating system 100A can be applied in a USB 3.0 chip, but the disclosure is not limited thereto.

The voltage converter 110 converts an input voltage VIN to an output voltage VOUT according to a feedback voltage FB. For example, the voltage converter 110 generates different output voltages according to different feedback voltages. The invention does not limit the kind of voltage converter 110. Any circuit can serve as the voltage converter 110, as long as the circuit is capable of generating different output voltages according to a feedback voltage. In one embodiment, the voltage converter 110 does not include an inter-integrated circuit (I2C) interface. In this case, the voltage converter 110 does not adjust the output voltage VOUT according to an I2C protocol. In one embodiment, the voltage converter 110 is a DC/DC converter, a pulse width modulation IC (PWM IC), or a linear regulator.

The protector 120 is coupled between the voltage converter 110 and the processing circuit 130 and generates a control signal EN according to the feedback voltage FB to activate or deactivate the voltage converter 110. In this embodiment, the protector 120 determines whether the feedback voltage FB is higher than a predetermined voltage. When the feedback voltage FB is higher than the predetermined voltage, the protector 120 utilizes a control signal EN to deactivate the voltage converter 110. When the feedback voltage FB is not higher than the predetermined voltage, the protector 120 utilizes the control signal EN to activate the voltage converter 110.

In one embodiment, the protector 120 controls the level of the control signal EN to activate or deactivate the voltage converter 110. For example, when the level of the control signal EN is set at a first level, the voltage converter 110 is not activated. When the level of the control signal EN is set at a second level, the voltage converter 110 is activated. The first level is different from the second level. In one embodiment, the first level is a high level, and the second level is a low level. In another embodiment, the first level is a low level, and the second level is a high level.

In this embodiment, the protector 120 is a comparator CMP to compare the feedback voltage FB with a reference voltage REF to generate a comparison result. The comparison result is served as the control signal EN. For example, when the feedback voltage FB is higher than the reference voltage REF, the comparator CMP outputs a low level. At this time, the voltage converter 110 is deactivated. However, when the feedback voltage FB is not higher than the reference voltage REF, the comparator CMP outputs a high level to activate the voltage converter 110.

When the feedback voltage FB is high, the protector 120 deactivates the voltage converter 110 to avoid that the large feedback voltage FB triggers an over voltage protect disposed in the voltage converter 110. Therefore, the voltage converter 110 is not turned off when the feedback voltage FB is high.

The processing circuit 130 is coupled to the voltage converter 110 and the protector 120 and processes the output voltage VOUT according to a control signal CNT to generate the feedback voltage FB. In this embodiment, the processing circuit 130 generates different feedback voltages according to different control signals. For example, when the control signal CNT is at a first level, the feedback voltage FB is equal to a first voltage. When the control signal CNT is at a second level, the feedback voltage FB is equal to a second voltage. In this embodiment, the first level is different from the second level, and the first voltage is different from the second voltage. In one embodiment, when the first level is a high level, the second level is a low level. In another embodiment, when the first level is a low level, the second level is a high level. Additionally, the first voltage may be higher than the second voltage.

Figure 1B:
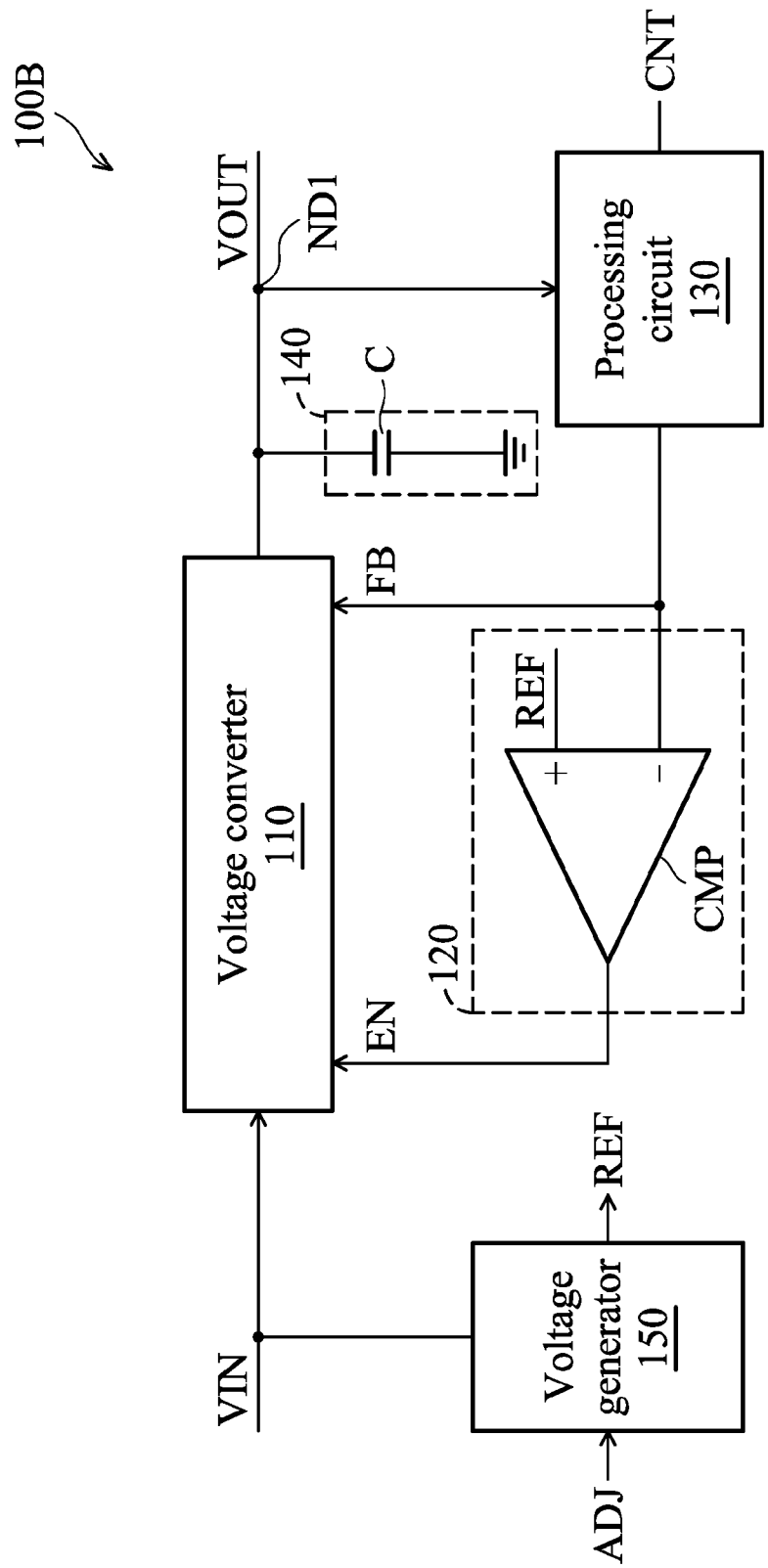

The invention does not limit how the processing circuit 130 processes the output voltage VOUT. The details of the processing circuit 130 will be described in greater detail with reference to FIG. 2. FIG. 1B is a schematic diagram of another exemplary embodiment of the operating system, according to various aspects of the present disclosure. FIG. 1A is similar to FIG. 1B except for the addition of an energy storage device 140 and a voltage generator 150. As shown in FIG. 1B, the energy storage device 140 is coupled to a node ND1. When the voltage converter 110 is activated, the energy storage device 140 is charged according to the output voltage VOUT. When the voltage converter 110 is deactivated, the energy storage device 140 provides power to the node ND1 to avoid the level of the output voltage dropping too low. In this embodiment, the energy storage device 140 is a capacitor C, however, this is not a limitation to the present invention. The voltage stored in the capacitor C is capable of holding the output voltage VOUT higher than a specific voltage during a fixed time. The specific voltage can maintain the operation of electronic elements receiving the output voltage VOUT.

The voltage generator 150 outputs the reference voltage REF according to an adjustment signal ADJ. In this embodiment, the voltage generator 150 divides the input voltage VIN to generate many divided results and selects one of the divided results to serve as the reference voltage REF according to the adjustment signal ADJ. In another embodiment, the voltage generator 150 generates a single divided result. The single divided result is served as the reference voltage REF.

Figure 2:
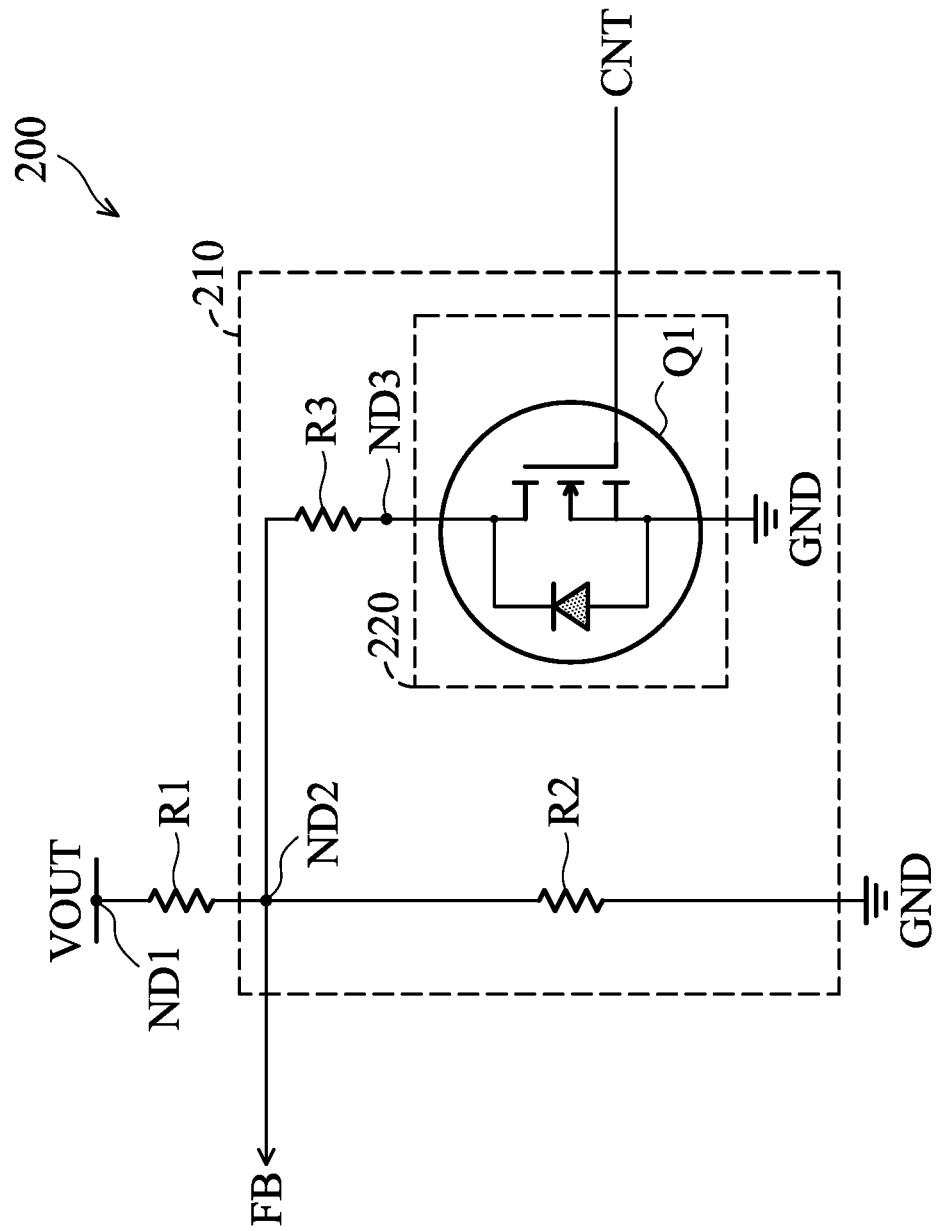
FIG. 2 is a schematic diagram of an exemplary embodiment of a processing circuit, according to various aspects of the present disclosure.

FIG. 2 is a schematic diagram of an exemplary embodiment of a processing circuit, according to various aspects of the present disclosure. As shown in FIG. 2, the processing circuit 200 includes a resistor R1 and an impedance unit 210. The resistor R1 connects to the impedance unit 210 in series between the node ND1 and a ground node GND to divide the output voltage VOUT. In this embodiment, the resistance of the impedance unit 210 is determined by the control signal CNT. For example, when the control signal CNT is at a first level, the impedance unit 210 has a first resistance. Therefore, the feedback voltage FB is equal to a first voltage. When the control signal CNT is at a second level, the impedance unit 210 has a second resistance. Therefore, the feedback voltage FB is equal to a second voltage. In one embodiment, the second resistance is less than the first resistance. In this case, the second voltage is lower than the first voltage. In other embodiments, the second resistance may be higher than the first resistance. Therefore, the second voltage is higher than the first voltage.

The impedance unit 210 includes resistors R2~R3 and a switch 220, but the disclosure is not limited thereto. Any circuit can serve as the impedance unit 210, as long as the circuit is capable of providing different resistances according to the level of a control signal. In this embodiment, the resistor R2 is coupled between a node ND2 and the ground node GND. The node ND2 outputs the feedback voltage FB. The resistor R3 is coupled to the node ND2 and a node ND3. The switch 220 is connected to the resistor R3 in series and coupled to the ground node GND. The switch 220 controls the level of the node ND3 according to the control signal CNT.

For example, when the control signal CNT is at a first level, the switch 220 is turned off. Therefore, the level of the node ND3 is not equal to the level of the ground node GND. At this time, the resistors R1 and R2 divide the output voltage VOUT. Therefore, the feedback voltage FB is equal to a first voltage. However, when the control signal CNT is at a second level, the switch 220 is turned on. Therefore, the level of the node ND3 is equal to the level of the ground node GND. At this time, the resistor R2 is parallel with the resistor R3, and the feedback voltage FB is equal to a second voltage.

In this embodiment, the switch 220 is an N-type transistor Q1. The gate of the N-type transistor Q1 receives the control signal CNT. The input terminal (drain) of the N-type transistor Q1 is coupled to the node ND3. The output terminal (source) of the N-type transistor Q1 is coupled to the ground node GND. In other embodiments, the switch 220 can be replaced with a P-type transistor.

Figure 3:
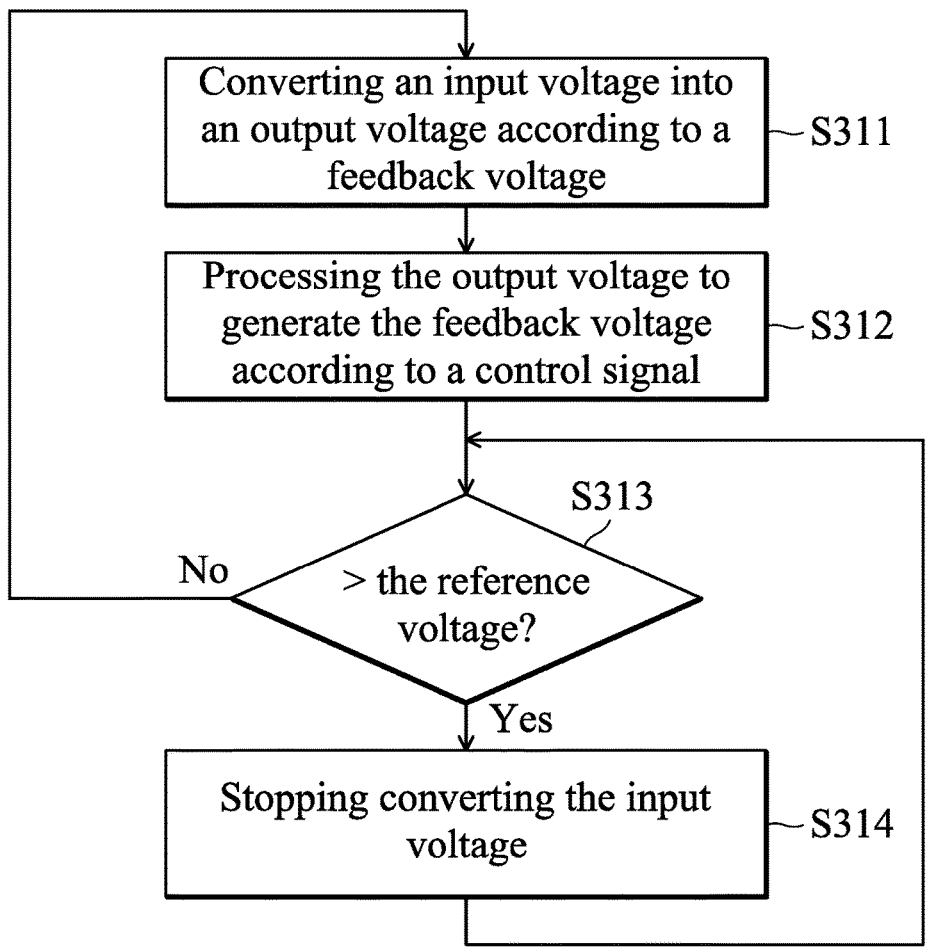
FIG. 3 is a flowchart of a control method according to an embodiment of the present invention.

FIG. 3 is a flowchart of a control method according to an embodiment of the present invention. In one embodiment, the control method of the invention can be applied in a USB 3.0 chip. First, an input voltage is converted into an output voltage according to a feedback voltage (step S311). In one embodiment, a voltage converter is utilized to process the input voltage. The voltage converter may convert the input voltage to different output voltages according to different feedback voltages.

For example, when the feedback voltage is equal to a first voltage, the output voltage is equal to a third voltage. When the feedback voltage is equal to a second voltage, the output voltage is equal to a fourth voltage. The first voltage is different from the second voltage, and the third voltage is different from the fourth voltage. In one embodiment, the first voltage is higher than the second voltage, and the third voltage is lower than the fourth voltage. The invention does not limit the kind of voltage converter. In one embodiment, the voltage converter does not include an I2C interface. In another embodiment, the voltage converter is a DC/DC converter, a PWM IC, or a linear regulator.

The output voltage is processed to generate the feedback voltage according to a control signal (step S312). In one embodiment, step S312 is to divide the output voltage, and the divided result serves as the feedback voltage. Different control signals may correspond to different feedback voltages. For example, when the control signal is at a first level, the feedback voltage is equal to a first voltage, and when the control signal is at a second level, the feedback voltage is equal to a second voltage. The first level is different from the second level. For example, when the first level is a high level, the second level is a low level. In another embodiment, when the first level is a low level, the second level is a high level. Additionally, the first voltage may be lower than or higher than the second voltage.

The feedback voltage is detected (step S313). In this embodiment, step S313 is to compare the feedback voltage with a reference voltage. When the feedback voltage is higher than the reference voltage, step S314 is to stop converting the input voltage and step S313 is performed to continuously detect the feedback voltage. When the feedback voltage is not higher than the reference voltage, step S311 is executed to convert the input voltage according to the feedback voltage.

Since the output voltage may be utilized to drive many electronic elements, when the input voltage is not converted, the level of the output voltage may be too low and cannot normally drive the electronic elements. To normally provide power to the electronic elements, step S314 is performed to provide a stored voltage to serve as the output voltage to maintain the operation of the electronic elements, in other embodiments. In one embodiment, the stored voltage is provided by an energy storage device. In this case, when the output voltage is generated by step S311, the output voltage charges the energy storage device. When the output voltage is less than a minimum voltage, the voltage stored in the energy storage device is served as an output voltage.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An operating system, comprising:
a voltage converter converting an input voltage according to a feedback voltage to generate an output voltage;
a processing circuit coupled to the voltage converter and dividing the output voltage according to a control signal to generate the feedback voltage; and
a protector coupled to the voltage converter and the processing circuit and activating or deactivating the voltage converter according to the feedback voltage,
wherein the processing circuit comprises:
a first resistor coupled between a first node and a second node, wherein the first node receives the output voltage, and the second node outputs the feedback voltage;
a second resistor coupled between the second node and a ground node;
a third resistor coupled between the second node and a third node; and
a transistor comprising a gate receiving the control signal, an input terminal coupled to the third node and an output terminal coupled to the ground node.

2. The operating system as claimed in claim 1, wherein when the control signal is at a first level, the feedback voltage is equal to a first voltage, when the control signal is at a second level, the feedback voltage is equal to a second voltage, the first level is less than the second level, and the first voltage is higher than the second voltage.

3. The operating system as claimed in claim 1, wherein when the control signal is at a first level, the output voltage is equal to a third voltage, when the control signal is at a second level, the output voltage is equal to a fourth voltage, and the third voltage is different from the fourth voltage.

4. The operating system as claimed in claim 1, wherein when the feedback voltage is higher than a reference voltage, the voltage converter is deactivated, and when the feedback voltage is not higher than the reference voltage, the voltage converter is activated.

5. The operating system as claimed in claim 4, wherein the protector comprises:
a comparator comparing the feedback voltage and the reference voltage to deactivate or activate the voltage converter.

6. The operating system as claimed in claim 5, further comprising:
a voltage generator outputting the reference voltage according to an adjustment signal.

7. The operating system as claimed in claim 1, wherein the voltage converter does not comprise an inter-integrated circuit (I2C) interface.

8. The operating system as claimed in claim 1, wherein the voltage converter is a pulse width modulation (PWM) IC.

9. The operating system as claimed in claim 1, further comprising:
an energy storage device coupled to the first node, wherein when the voltage converter is activated, the energy storage device is charged according to the output voltage, and when the voltage converter is deactivated, the energy storage device provides power to the first node.

10. A control method comprising:
converting an input voltage to an output voltage according to a feedback voltage;
utilizing a processing circuit to divide the output voltage to generate the feedback voltage according to a control signal;
detecting the feedback voltage, wherein when the feedback voltage is higher than a reference voltage, the input voltage is not converted, and when the feedback voltage is not higher than the reference voltage, the input voltage is converted,
wherein the processing circuit comprises:
a first resistor coupled between a first node and a second node, wherein the first node receives the output voltage, and the second node outputs the feedback voltage;
a second resistor coupled between the second node and a ground node;
a third resistor coupled between the second node and a third node; and
a transistor comprising a gate receiving the control signal, an input terminal coupled to the third node and an output terminal coupled to the ground node.

11. The control method as claimed in claim 10, wherein when the feedback voltage is equal to a first voltage, the output voltage is equal to a third voltage, when the feedback voltage is equal to a second voltage, the output voltage is equal to a fourth voltage, the first voltage is different from the second voltage, and the third voltage is different from the fourth voltage.

12. The control method as claimed in claim 11, wherein the first voltage is higher than the second voltage, and the third voltage is less than the fourth voltage.

13. The control method as claimed in claim 10, wherein when the control signal is at a first level, the feedback voltage is equal to a first voltage, when the control signal is at a second level, the feedback voltage is equal to a second voltage, the first level is less than the second level, and the first voltage is higher than the second voltage.

14. The control method as claimed in claim 10, further comprising:
  storing the output voltage to generate a stored voltage; and
  serving the stored voltage as the output voltage when the input voltage is not converted.

* * * * *